US010152554B2

(12) United States Patent
Lewis et al.

(10) Patent No.: US 10,152,554 B2
(45) Date of Patent: Dec. 11, 2018

(54) DETECTING DIGITAL CONTENT VISIBILITY

(71) Applicant: Google LLC, Mountain View, CA (US)

(72) Inventors: Justin Lewis, Marina del Rey, CA (US); Robert Alexander Durbin, Marina del Rey, CA (US)

(73) Assignee: Google LLC, Mountain View, CA (US)

(*) Notice: Subject to any disclaimer, the term of this patent is extended or adjusted under 35 U.S.C. 154(b) by 386 days.

(21) Appl. No.: 15/050,810

(22) Filed: Feb. 23, 2016

(65) Prior Publication Data

US 2017/0242931 A1    Aug. 24, 2017

(51) Int. Cl.
| | |
|---|---|
| *G06F 7/02* | (2006.01) |
| *G06F 17/30* | (2006.01) |
| *G06F 17/21* | (2006.01) |
| *H04L 29/08* | (2006.01) |

(52) U.S. Cl.
CPC ...... *G06F 17/30905* (2013.01); *G06F 17/218* (2013.01); *G06F 17/30569* (2013.01); *G06F 17/30864* (2013.01); *G06F 17/30899* (2013.01); *H04L 67/02* (2013.01)

(58) Field of Classification Search
CPC ......... G06F 17/30905; G06F 17/30569; G06F 17/30864; G06F 17/30899; G06F 17/218; H04L 67/02
See application file for complete search history.

(56) References Cited

U.S. PATENT DOCUMENTS

| | | |
|---|---|---|
| 6,405,221 B1 | 6/2002 | Levine et al. |
| 7,801,885 B1 | 9/2010 | Verma |
| 8,397,159 B2 | 3/2013 | Ji et al. |
| 9,043,228 B1 | 5/2015 | Ross, Jr. et al. |
| 9,454,618 B1* | 9/2016 | Chen ..................... G06F 3/0481 |
| 2009/0048913 A1 | 2/2009 | Shenfield et al. |
| 2010/0153544 A1* | 6/2010 | Krassner ............. G06F 17/2247 709/224 |
| 2015/0254219 A1 | 9/2015 | Harel |

(Continued)

OTHER PUBLICATIONS

Office Action issued in European Application No. 16716768.3, dated May 4, 2017, 12 pages.

(Continued)

*Primary Examiner* — Bruce M Moser
(74) *Attorney, Agent, or Firm* — Fish & Richardson P.C.

(57) ABSTRACT

Methods, systems, and apparatus, including computer programs encoded on a computer storage medium, for identifying a set of digital content that are responsive to a search query; detecting an electronic tag within the set of digital content; automatically converting the electronic tag to a frame element; generating and transmitting to an user device a composite page that: is hosted at a different domain than at least some digital content; includes different digital content from the set of digital content; and initially hides presentation of the frame element in the composite page; receiving a request for additional content generated by the frame element that identifies one of the various digital content sources; embedding observation code into the additional content; and determining that the additional content was visually perceptible on a display of the user device based on an electronic message received from the intersection observer code executing at the user device.

14 Claims, 10 Drawing Sheets

(56) References Cited

U.S. PATENT DOCUMENTS

| | | | | |
|---|---|---|---|---|
| 2015/0278881 | A1* | 10/2015 | Agrawal | G06Q 30/0277 |
| | | | | 705/14.73 |
| 2016/0182672 | A1* | 6/2016 | Kuperman | H04L 67/2842 |
| | | | | 709/213 |
| 2018/0018399 | A1* | 1/2018 | Hamm | G06F 17/30899 |

OTHER PUBLICATIONS

International Search Report and Written Opinion in International Application No. PCT/US2016/025506, dated Oct. 28, 2016, 14 pages.

Office Action issued in Japanese Application No. 2017-511745, dated Jul. 9, 2018, 13 pages (with English Translation).

Office Action issued in Korean Application No. 10-2017-7005582, dated Jul. 30, 2018, 16 pages (with English Translation).

'github.com' [online] "Intersections Observers Explained," Jan. 28, 2016, [retrieved on Jun. 27, 2018] Retrieved from Internet: URL<https://github.com/w3c/IntersectionObserver/blob/1d1e3abc3f6d66c873c42d9e7a287175a01f4d09/explainer.md> 5 pages.

* cited by examiner

402

```
window.context.observeIntersection(function(changes) {
  changes.forEach(function(c) {
    console.info('Height of intersection', c.intersectionRect.height);
  });
});
```

404

```
var unlisten = window.context.observeIntersection(function(changes) {
  changes.forEach(function(c) {
    console.info('Height of intersection', c.intersectionRect.height);
  });
});

// condition to stop listening to intersection messages.
unlisten();
```

FIG. 4

DETECTING DIGITAL CONTENT VISIBILITY

FIELD

The present application relates to visibility of digital content presented on a display of a client device.

BACKGROUND

Digital content is distributed to a wide variety of client devices. For example, a large amount of digital content is distributed to portable computing devices, such as mobile phones, tablet devices, and other portable computing devices. Often, the digital content distributed to these portable devices is transmitted over wireless connections, including mobile phone networks (e.g., cellular communications networks).

SUMMARY

Innovative aspects of the subject matter described in this specification may be embodied in methods that include the actions of electronically crawling various digital content sources, by one or more servers, to identify and store, by the one or more servers, various digital content from the various digital content sources in a repository; identifying a set of the digital content that are responsive to a search query; detecting, by the one or more servers, an electronic tag within at least one portion of digital content in the set of digital content; automatically converting, by the one or more servers, the electronic tag to a frame element; generating, by the one or more servers, and transmitting, to a given user device that is remotely located relative to the one or more servers, a composite page that: is hosted at a different domain than at least some digital content in the set of the digital content; includes different digital content from the set of digital content that are identified and stored from the various multiple different digital content sources; and initially hides presentation of the frame element in the composite page; receiving, by the one or more servers, an electronic request for additional content that was generated by the frame element and that identifies one of the various digital content sources; embedding, by the one or more servers and in response to the request, observation code into the additional content provided responsive to the electronic request; determining that the additional content was visually perceptible on a display of the given user device based on an electronic message received from the intersection observer code executing at the given user device; and modifying a log based on the visual perception of the additional content with the digital content that was identified in the request.

Other embodiments of these aspects include corresponding systems, apparatus, and computer programs, configured to perform the actions of the methods, encoded on computer storage devices.

These and other embodiments may each optionally include one or more of the following features. For instance, executing, by the given user device and within the frame element, the observation code, wherein execution of the observation code causes operations to be performed at the user device, including registering the observation code within a parent window within which the frame element is located. The execution of the observation code causes operations to be performed at the user device, including accumulating, by the observation code, information specifying a location of the frame element in the composite page and specifying a portion of the composite page that is presented within the display. The execution of the observation code causes operations to be performed at the user device, including determining, based on the information specifying the location of the frame element and specifying the portion of the composite page presented within the display, that at least a specified portion of the additional content was presented within the display for at least a specified amount of time. The execution of the observation code causes operations to be performed at the user device, including generating the electronic message specifying that the additional content was presented within the display; and transmitting the electronic message to the one or more servers. In response to the electronic request, updating, by the user device, the composite page to reveal the digital content from the set of digital content associated that is selected, wherein updating the composite page is independent of an additional request for the digital content.

Innovative aspects of the subject matter described in this specification may be embodied in a system that includes an electronic document inspection device that electronically crawls various digital content sources to identify and store various digital content from the various digital content sources in a repository; a tag converter device that detects an electronic tag within at least one portion of digital content in the set of digital content, and automatically converts the electronic tag to a frame element; a composite page generator that generates and transmits the composite page to a given user device that is remotely located relative to the one or more servers, wherein the composite page is hosted at a different domain than at least some digital content in the set of the digital content, includes different digital content from the set of digital content that are identified and stored from the various multiple different digital content sources, and initially hides presentation of the frame element in the composite page; an embedding device that embeds an observation code into additional content in response to a request for additional content that was generated by the frame element and that identifies one of the various digital content sources; and a visibility tracking device that determines that the additional content was visually perceptible on a display of the given user device based on an electronic message received from the observation code executing at the given user device, and that modifies a log based on the visual perception of the additional content with the digital content that was identified in the request.

Other embodiments of these aspects include corresponding systems, apparatus, and computer programs, configured to perform the actions of the methods, encoded on computer storage devices.

Innovative aspects of the subject matter described in this specification may be embodied in a system that includes a network accessible device including a communication section (CS) adapted to provide a communication connection between the network accessible device (NAD) and (i) at least one content host server (CHS), (ii) at least one third party content server (3PCS), (iii) at least one a media host server (MHS), and/or (iv) a visibility logging server (VLS) via a network to receive at least one (i) content item (CI), (ii) third party content item (3PCI) and/or (iii) media item (MI) from the respective server and to transceive messages regarding the received items to At least one of the respective servers; —a processor (µP) designed or configured to operate a graphical user interface (GUI) adapted to present to a user, at least a first, reduced part and/or a second, expanded part of at least one item received from a third party content server within at least one respective section of the graphical user interface (GUI) attributed to the at least one third party content server; an item handler (IH) adapted to (i) select, by a user action relative to the network accessible device, an item from a population of at least partly presented items, and in response to the user selection, to (ii) present at least the second, expanded part of the selected one item in a respective section of the graphical user interface (GUI) to the user and relative to the second, expanded part of a third party content item, at least one media item; an item analyzer (IA) adapted to analyze the presented third party content item and/or the presented media item with respect to a visibility metric and/or any user action with respect to the presented third party content item and/or the presented media item, and to transmit at least one respective message to at least one of the at least one content host server, (ii) the at least one third party content server, (iii) the at least one a media host server, and/or (iv) the visibility logging server, and wherein the message includes a visibility metric value.

Other embodiments of these aspects include corresponding systems, apparatus, and computer programs, configured to perform the actions of the methods, encoded on computer storage devices.

These and other embodiments may each optionally include one or more of the following features. For instance, a visibility metric of the presented third party content item and/or the presented media item includes at least one of (i) a time duration of its presentation, (ii) a display position of its presentation, and (iii) a measure of completeness of its presentation. The item handler is adapted to convert a received media item into an iframe or a flash media for presenting it and generate a source code for presentation and/or interpretation of the received media item by a renderer from attributes that are received together with the received media item, and wherein a flag is included as "one" to specify a specific environment. The item handler is adapted to include third party content item into a separate window on the display. The item handler includes the renderer which is adapted to embed an intersection observer compliant listener that is capable of receiving/transmitting visibility metric measurement messages.

Innovative aspects of the subject matter described in this specification may be embodied in a method including providing a communication connection between a network accessible device and (i) at least one content host server, (ii) at least one third party content server, (iii) at least one a media host server, and/or (iv) the visibility logging server via a network to receive at least one (i) content item, (ii) third party content item and/or (iii) media item from the respective server and to transceiving messages regarding the received items to the respective servers; present to a user, at least a first, small part and/or a second, large part of at least one item received from a third party content server within at least one respective section of the display attributed to the at least one third party content server; selecting, by a user action relative to the network accessible device, an item from a population of at least partly presented items, and in response to the user selection, presenting at least the second, larger part of the selected one item in a respective section of the display to the user and relative to the second, larger part of a third party content item at least one media item; analyzing the presented third party content item and/or the presented media item with respect to a visibility metric and/or any user action with respect to the presented third party content item and/or the presented media item, and to transmit at least one respective message to at least one of the at least one content host server, (ii) the at least one third party content server, (iii) the at least one a media host server, and/or (iv) the visibility logging server, and wherein the message includes a visibility metric value.

Other embodiments of these aspects include corresponding systems, apparatus, and computer programs, configured to perform the actions of the methods, encoded on computer storage devices.

Particular implementations of the subject matter described in this specification can be implemented so as to realize one or more of the following advantages. Implementations of the present disclosure provide maintaining the user within a single application (e.g., a digital content discovery application) to improve the user experience by reducing the transition time of switching between digital content. Further, navigation by the user to other pieces of digital content (e.g., other search results) are improved, and made visually seamless. Moreover, maintaining the user within a single application ensures the user will continue browsing new digital content from the application as opposed to transitioning to other applications. Additionally, maintaining the user within the single application prevents exposure of unwanted security risks.

Moreover, latencies caused by making multiple requests for digital content over a network are reduced by aggregating digital content from multiple different digital content sources (e.g., servers) into a single document (e.g., web page). For example, the number of client initiated network calls (or requests) required to render and present the single document containing the aggregated digital content at the client will generally be lower than the number of network calls the client would need to make to separately obtain, render, and present the content from each of the different digital content sources. Each network call that is required contributes to the total amount of time required to obtain, render, and present the digital content, and therefore increases the latency experienced following a user request for digital content.

Furthermore, content placeholders embedded in the digital content that is obtained from the multiple different digital content sources can be converted to frames that include information identifying the appropriate digital content source from which the digital content was obtained. Thus, a visibility of the digital content provided in the frame can be detected as being presented by the appropriate digital content source while the aggregated digital content is provided from the domain of a content aggregator.

The present disclosure also relates to providing content items for display with publisher content on a network accessible device, e.g. a mobile communication device or a desktop computer.

Publisher display items are often stored on or transferred to a network accessible device for presentation via a graphical user interface (GUI) of the device. Publisher display items may take a variety of forms, such as but not limited to web pages, mobile applications (apps), e-reader books, email services, search engines, games, audio works, video works, etc. A publisher display item may include content supplied by the publisher as well as one or more slots to accommodate the insertion of content item(s) from third parties. The content items may be selected from a population of available content items from various content item providers. Content items can include a creative portion and an interactive portion. The creative portion may provide textual, audio, image and/or video information to the user. The interactive portion, when selected (e.g. "clicked", double-clicked or finger-tapped) by the user, may alter the display by connecting the device to a linked web page or other location ("landing page") associated with the creative portion.

When presenting content, such as a publisher item, on the network accessible device, this oftentimes is carried out in a browser environment provided by a content host server. This browser environment can be the home page of a search engine, or the like. When a user effects e.g. a query in the browser environment, one or more third party content items are provided by a third party content server. In certain scenarios, in addition to the third party content items at least one a media host server provides additional media items which are more or less related to the third party content items. Providing the additional media items involves additional network traffic and presentation effort on the graphical user interface (GUI) of the device. In addition, the presentation of the media items on the graphical user interface depends on the capabilities (size, graphical resolution, window overlay, etc.) of the graphical user interface. Moreover, the presentation of the media items on the graphical user interface depends on user behavior in relation to the media items as well as the presented third party content items. For example, the user can scroll or navigate through the presented third party content item slower or faster, thereby also affecting the visibility of the media items as well as the presented third party content items. The user may also take action relative to the media items or the presented third party content items, such as activate, e.g. "click" on interactive sections of the graphical user interface, whereby a re-routing to another web-site or the like can be effected.

In this context, the visibility of the media items and/or the presented third party content items is of great interest, since sending out items that have little or no visibility on the network accessible device only increases the network/internet traffic, causes an increased CPU utilization and battery consumption in the network accessible device.

The technical problem of the present invention is therefore to avoid unnecessary internet traffic.

This problem is solved by the arrangement or methodology defined in the independent claims.

DESCRIPTION OF THE DRAWINGS

FIG. 4 illustrates an example of computer-implemented programming language code of an intersection observer.

DETAILED DESCRIPTION

This document describes a system that enables low-latency presentation of digital content provided by various digital content providers. For example, the system described obtains various digital content from various different servers (e.g., each addressed at different fully qualified domains), and generates a composite content page that includes the digital content from the various different servers. In some implementations, portions of the aggregated digital content are hidden when the composite page is initially presented at a user device. For example, the initial visualization of the composite page that is presented at the user device can include a sub-portion (i.e., less than all) of the digital content obtained from multiple different ones of the various different servers. When the user device detects user interaction with a given sub-portion of the digital content, the visualization of the composite page is dynamically changed (client-side) to reveal additional portions (or all) of the digital content corresponding to the sub-portion with which the user interacted. In this way, the system provides an interactive user interface that dynamically changes the visualization of the composite page and/or underlying data based on the user interaction.

When the composite page is generated, the digital content from the various different servers will be presented from the domain of the entity that generates the composite page (or another domain that differs from that of the various different servers). Therefore, absent some mechanism to determine the source of the digital content being viewed by the user, all views of the digital content would be attributed to the domain of the composite entity. The description that follows provides implementation details related to a mechanism that will detect, and properly attribute, user interaction with and/or views of the digital content provided by the various different servers despite the fact that the digital content is presented in a domain that differs from those various different servers. In some implementations, the tracking and attribution is facilitated by converting a content placeholder that is included in the code of the digital content into a frame in which the digital content will be presented. When the portion of the digital content containing the frame is revealed/presented at the user device, the frame will generate a request for the digital content and identify the appropriate digital content source of the digital content in which the frame was embedded. When the request is received, observation code is embedded into the digital content selected to be served in response to the request, and this observation code will enable the user device to determine how much of the digital content is visible within the display of the user device, and report this information back to the server with information specifying the proper digital content source.

Figure 1:
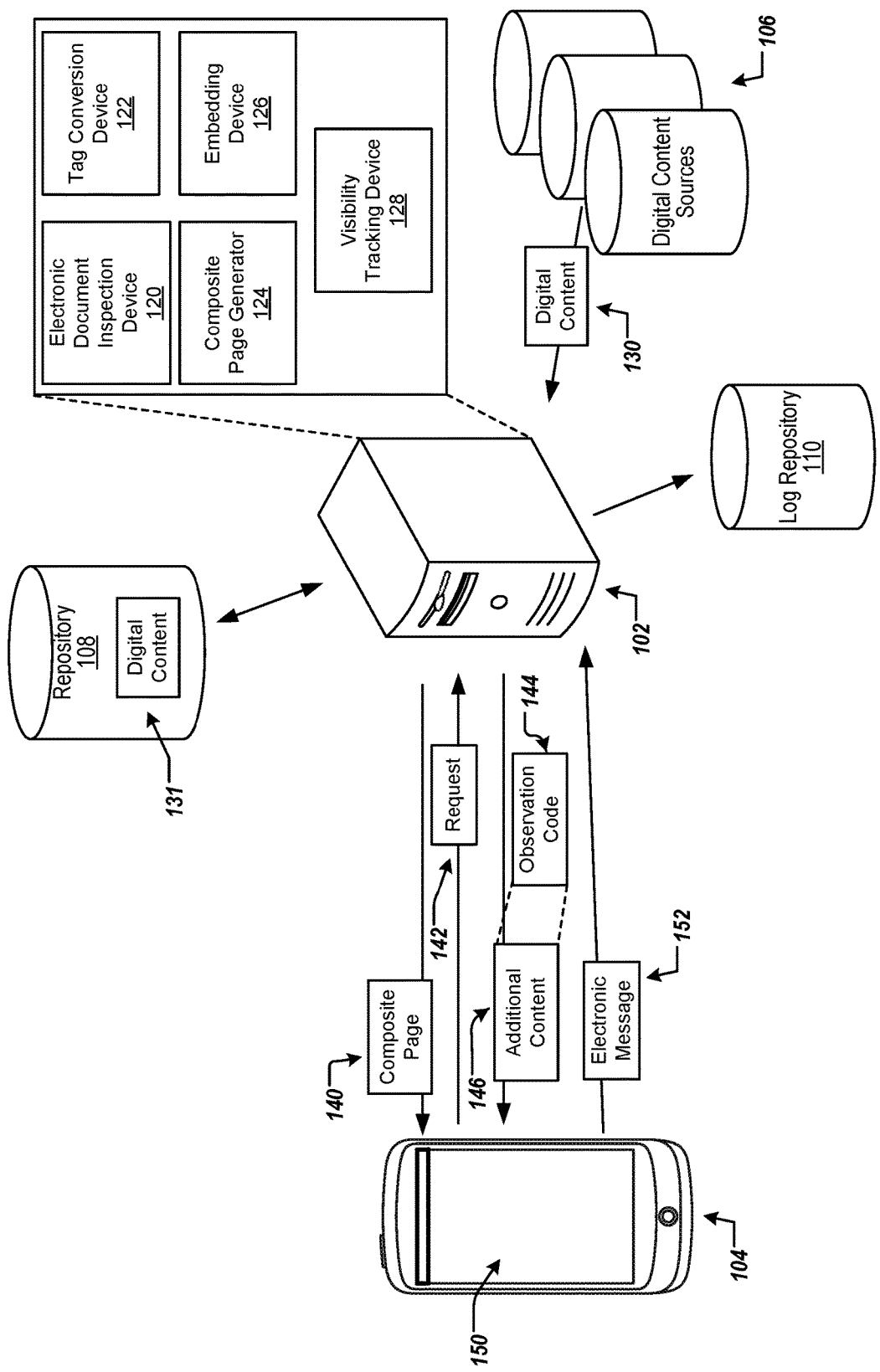
FIG. 1 illustrates an environment for detecting a visibility of digital content on a composite page.

FIG. 1 illustrates an environment 100 for detecting a visibility of digital content on a composite page. The environment 100 includes a server computing system 102, a client computing device 104, digital content sources 106, a digital content repository 108, and a log repository 110. The client computing device 104 further includes an electronic document inspection device 120, a tag converter device 122, a composite page generator 124, an embedding device 126, and a visibility tracking device 128. The client computing device 104 is in communication with the server computing system 102 over one or more networks. The server computing system 102 is in communication with the digital content sources 106, the digital content repository 108, and the log repository 110 over one or more networks.

In some implementations, the server computing system 102, and in particular, the electronic document inspection device 120, electronically crawls the digital content sources 106 and stores various digital content from the various digital content sources 106. Specifically, the electronic document inspection device 120 crawls the digital content sources 106 to identify digital content 130. The electronic document inspection device 120 fetches the digital content 130 from the digital content sources 106 and the server computing system 102 stores the digital content 130 at the digital content repository 108 as stored digital content 131. In some examples, the stored digital content 131 is a cached version of the digital content 130.

In some examples, the electronic document inspection 120 crawls and obtains the digital content 130 from the digital content sources 106 at any time, including continuously, at discrete intervals, and/or in response to a request. In some examples, the electronic document inspection 120 crawls and obtains the digital content 130 from the digital content sources 106 prior to receiving a search query related to the digital content 130. In some examples, the electronic document inspection 120 crawls and obtains the digital content 130 from the digital content sources 106 in response to receiving a search query related to the digital content 130.

In some examples, when the electronic document inspection device 120 obtains the digital content 130 from the digital content sources 106, the obtained digital content 130 includes a complete version of the digital content 130. That is, the digital content 130 comprises an entirety of the digital content (including relevant formatting data) as provided (and/or generated) by the digital content sources 106 that would be displayed by an electronic document hosted at a domain associated with the appropriate digital content source 106. In some examples, the digital content 130 is associated with an accelerated mobile pages (AMP) format.

In some examples, the server computing system 102 receives a search query, e.g., from the client computing device 104, over one or more networks. The search query can include a textual query, a visual query, an audio query, or a combination thereof.

In some implementations, the server computing system 102 identifies a set of the digital content 131 that are responsive to the search query. Specifically, the server computing system 102 accesses the digital content 131 stored by the digital content repository 108 (and that was obtained from the digital content sources 106) to identify a set of the digital content 131 that is response to the search query. The set of the digital content 131 can be determined to be responsive to the search query based on one or more factors, including keywords, meta-information, and other information.

In some implementations, the server computing system 102, and in particular, the tag converter device 122, detects an electronic tag within at least one portion of the digital content in the set of digital content 131. Specifically, at least a portion of the digital content 131 stored by the digital content repository 108 is associated with a respective electronic tag. In some examples, the electronic tag is an HTML element (e.g., "<amp-ad>" tag) that is included within the digital content 131 by the appropriate digital content sources 106. That is, the digital content sources 106 include the respective electronic tag within the digital content 130 (e.g., when generating the digital content 130) and that is stored in the repository 108 as stored digital content 131. In some examples, the electronic tag is part of the specification associated with the AMP specification. The electronic tag can be considered a placeholder for third party content that will be integrated into the digital content at a later time. For example, when the digital content is being rendered, or the code of the digital content is otherwise being executed by the client computing device 104, the electronic tag can cause the client computing device 104 to initiate a network call or request for content that will be integrated into a visualization of the digital content.

In some examples, the tag converter device 122 detects an electronic tag associated with at least one portion of digital content in the set of digital content 131 that is responsive to the search query.

In some implementations, the server computing system 102, and in particular, the tag converter device 122, automatically converts the electronic tag to a frame element. Specifically, the tag converter device 122 modifies the code of the digital content to replace the electronic tag that is associated with the portion of digital content 131 with a frame element. In some examples, the tag converter device 122 converts the electronic tag to the frame element utilizing javascript of the AMP specification. That is, the tag converter device 122 coverts the electronic tag to the frame element based on a javascript library provided by the server computing system 102 that is associated with the AMP specification.

In some examples, converting the electronic tag to the frame element includes the tag converter device 122 identifying one of the digital content sources 106 associated with the digital content 131 that is associated with the electronic tag. For example, when the digital content 131 is obtained from the digital content source, the tag converter device 122 will detect the tag within the digital content 131. The tag converter device 122 identifies the digital content source 106 associated with the digital content 131 that includes the electronic tag, for example, based on attributes associated with the electronic tag. The tag converter device 122 can then create a frame element that includes data identifying the digital content source, thereby associating the frame element with the digital content source, such that requests for content initiated by, or submitted through, the frame element will be associated with the appropriate digital content source 106, irrespective of the domain that serves the digital content 131. In turn, the tag converter device 122 can replace the electronic tag with the frame element, such that the frame element will request third party content to be incorporated into the digital content 131 when a visualization of the digital content 131 is presented at the client computing device 104. In some examples, the frame element can include an iframe element.

In some implementations, the server computing system 102, and in particular, the composite page generator 124, generates a composite page 140. In some examples, the composite page 140 is i) hosted at a different domain than at least some digital content in the set of the digital content 131 and ii) includes different digital content from the set of digital content 131 that is identified and stored from the various multiple different content sources 106. That is, the composite page 140 can be hosted at a domain (e.g., example.com) that differs from the domains associated with the set of the digital content 131 (e.g., domains associated with the digital content sources 106). Further, the digital content of the initial version of the composite page 140 provides for display a portion (or snippet) of the digital content 131 that is identified as responsive to the search query. For example, the initial version of the composite page 140 can include search results that each include a snippet of the corresponding digital content 131.

Furthermore, in some examples, the composite page 140 initially hides presentation of at least some of the digital content that includes a frame element. That is, the initial version of the composite page 140 hides from display presentation of the frame element. However, for each displayed snippet of the digital content of the composite page 140, the composite page 140 includes corresponding digital content 131 that is hidden from an initial display of the composite page 140. That is, the initial version of the composite page 140 i) provides for display a snippet of the digital content 131 that is different than the complete digital content 131 and ii) includes the complete digital content 131 hidden from the initial version of the composite page 140.

In some examples, for each snippet of the digital content 131 provided by the composite page 140, when conversion of the electronic tag to the frame element of the snippet of the digital content 131 and identification of the digital content source 106 associated with the snippet of the digital content 131 occurs, as mentioned above, a flag is included within the snippet of the digital content 131. In some examples, the flag can include "amp=1" to identify the environment associated with the snippet of the digital content 131, described further below.

In some implementations, the server computing system 102, and in particular, the composite page generator 124 transmits the composite page 140 to the client computing device 104 that is remotely located relative to the server computing system 102, e.g., over one or more networks. In some examples, the composite page 140 is transmitted to the client computing device 104 in response to request, e.g., in response to the search query. When transmitting the composite page 140 to the client computing device 104 by the server computing system 102, the composite page 140 includes i) snippets of the digital content 131 identified as responsive to the search query (e.g., for initial display), and ii) complete portions of the digital content 131, including formatting data (e.g., hidden from initial display).

Figure 2:
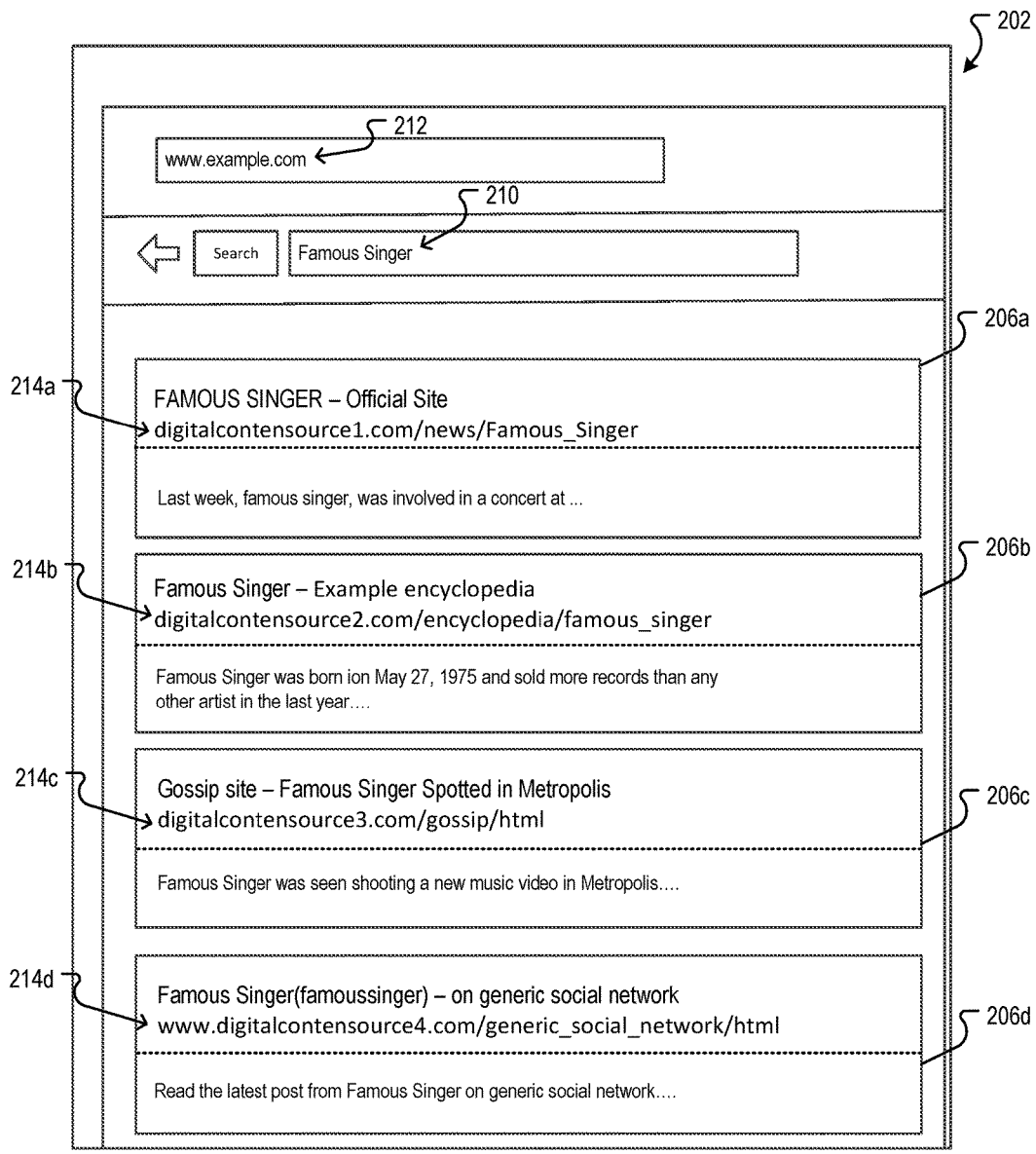
FIG. 2 illustrates an example graphical user interface displaying an example composite page.

FIG. 2 illustrates an example of a composite page 202, similar to the composite page 140 of FIG. 1. The composite page 202 includes search results 206 (shown as search results 206a, 206b, 206c, 206d) that are responsive to a search query 210. In the illustrated example, the search results 206 are responsive to the search query 210 "famous singer" and are based on the digital content 131 stored by the digital content repository 108. The search results 206 each include a modified version of the corresponding digital content 131, including a snippet of the corresponding digital content 131 (e.g., a headline associated with the digital content 131, a domain associated with digital content 131, and a first textual portion of the corresponding digital content 131).

Furthermore, in the illustrated example, the composite page 202 is hosted at a domain 212 (e.g., example.com) different than domains 214 (shown as domains 214a, 214b, 214c, 214d) that host the digital content 131 associated with the search results 206 respectively (e.g., digitalcontentsource1.com, digitalcontentsource2.com, digitalcontentsource3.com, digitalcontentsource4.com). Additionally, the initial version of the composite page 202 hides from display the frame element associated with the search result 206a.

In some examples, the client computing device 104 updates a visualization of the composite page 140 presented in a display of the client device. For example, one of the snippets of the digital content 131 provided within the composite page 140 is selected, e.g., by a user of the client computing device 104. In response to the selection, the client computing device 104 updates the visualization of the composite page 140 to reveal the digital content 131 associated with the selected snippet of the digital content 131. Specifically, the composite page 140 is graphically animated (or altered) to transition from the initial version of the composite page 140 that includes the snippets of the digital content 131 to an updated version of the composite page 140 that includes the full digital content 131 associated with the selected snippet of the digital content 131. Note that this updated version of the composite page 140 can be presented without requiring an additional network call or request for the digital content 131 being revealed by way of the user interaction. Rather, the digital content 131 that is already included in the composite page 140 is revealed to the user.

In some examples, the composite page 140 is updated to reveal the digital content 131 associated with the selected snippet of the digital content 131 independent of an additional request for content associated with the digital content 131. That is, as the composite page 140 includes the full digital content 131 upon initial transmission of the composite page 140 from the server computing system 102 to the client computing device 104, an additional request (e.g., an additional network call or request for the digital content 131 being revealed by way of the user interaction) for the remaining portions of the full digital content 131 is not needed. Rather, the full digital content 131 is previously provided (during the initial transmission of the composite page 140), and upon animating the composite page 140 from the initial version including the snippets of the digital content 131, the composite page 140 is updated to include the full digital content 131 that was previously provided. As a result, a user (e.g., a user associated with the client computing device 104) remains within a single domain of the composite page 140 (e.g., example.com) while accessing multiple domains (e.g., the domains of the digital content sources 106 associated with the digital content 131 of the composite page 140).

In some examples, by providing the full digital content 131 associated with the composite page 140 upon initial transmission of the composite page 140 from the server computing system 102 to the client computing device 104, a number of network round trips between the server computing system 102 and the client computing device 104 is reduced. That is, the full content of the digital content 131 associated with the composite page 140 is transmitted one time from the server computing system 102 to the client computing device 104. Additionally, code libraries used to create the visualization of the composite page 140 can be limited to those provided by the server computing system 102, so that additional code libraries need not be loaded when the digital content 131 is revealed. As a result, this reduces the latency of displaying (e.g., revealing) the digital content 131 that is associated with the selected snippet of the digital content 131 on a display 150 of the client computing device 104.

In some implementations, the server computing system 102 receives an electronic request 142 for additional content 146, e.g., over one or more networks. Specifically, the electronic request 142 is generated by the frame element and identifies one of the digital content sources 106 (e.g., the digital content source that contained the amp-ad tag that was replaced with the frame). In some examples, as mentioned above, the presentation of one of the snippets of the digital content 131 provided within the composite page 140 is selected, e.g., by a user of the client computing device 104. In response to revealing the full digital content 131 associated with the selected snippet, the frame element associated with the revealed full digital content 131 generates the electronic request 142 and the client computing device 104 transmits the electronic request 142 to the server computing system 102. The electronic request 142 identifies the digital content provider 106 that is associated with the full digital content 131.

In some examples, the request for the additional content 146 can include a request for third-party content (e.g., videos, text, images, or other content that is provided by an entity other than the entity that provides the digital content in which the frame is embedded). As a result, in response to revealing the full digital content 131, the additional content 146 is requested. For example, the additional content 146 can be displayed within the composite page 140. In some examples, the server computing system 102 (or another server or computer system), in response to receiving the electronic request, obtains the additional content 146 from the appropriate content source 106, from a third party that is hosting the additional content 146, or combination thereof. In some examples, the visualization of the composite page 140 is further updated to reveal the additional content 146.

Figure 3:
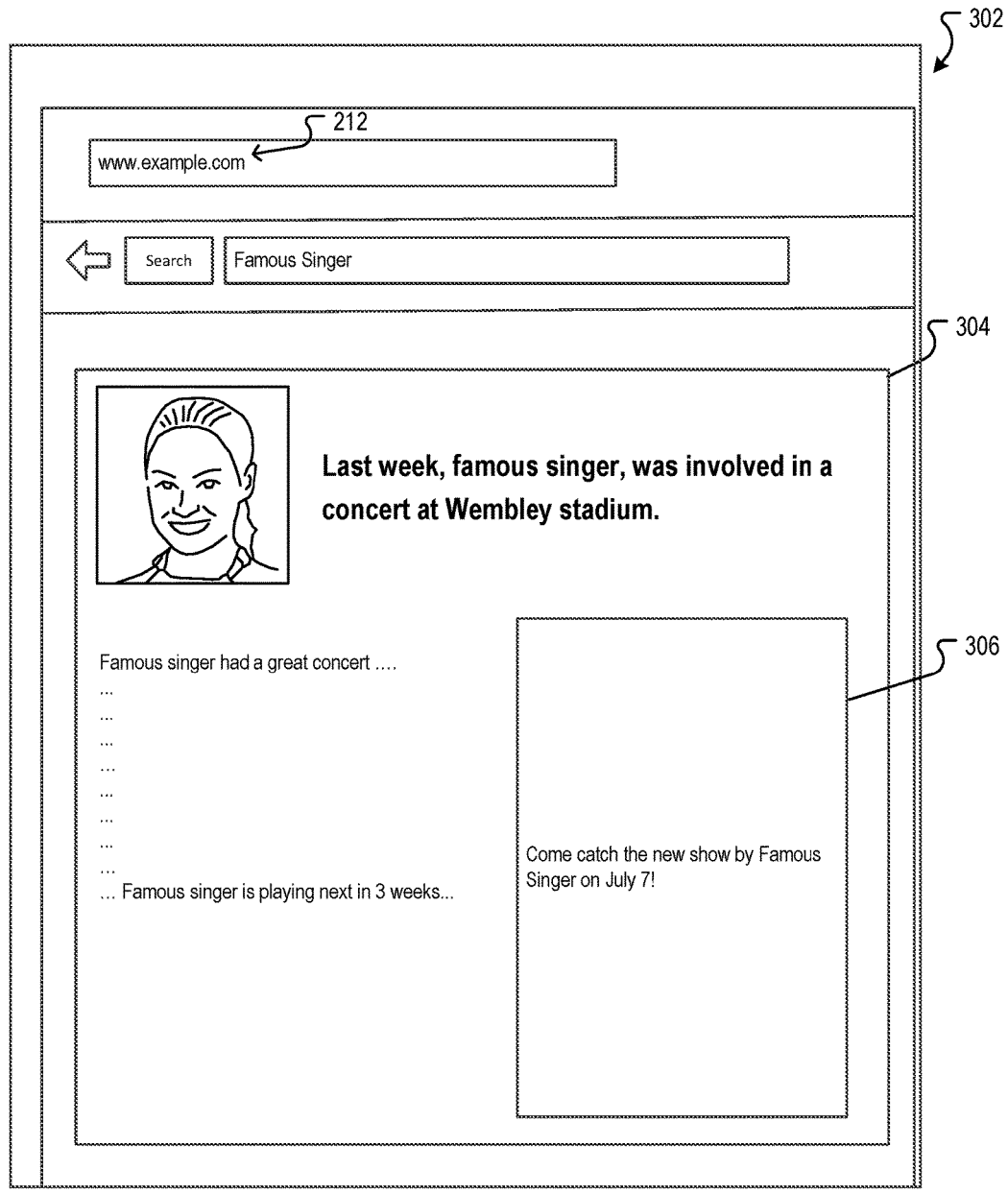
FIG. 3 illustrates an example graphical user interface displaying an example composite page including additional content.

FIG. 3 illustrates an example composite page 302, similar to the composite page 202 of FIG. 2 and the composite page 140 of FIG. 1. Specifically, the composite page 302 is an updated version of the composite page 202 of FIG. 2 that is, after revealing the full digital content 131 associated with selected snippet of the digital content 131, and including the additional content 146. For example, the selected snippet of the digital content 131 corresponds to search result 206a, as shown in FIG. 2. In response to the selection of the search results 206a, the composite page 202, of FIG. 2, is updated to reveal the full digital content 131 associated with the search result 206a and reveal the additional content 146, forming the composite page 302. In the illustrated example, the search result 206a corresponds to a news article associated with the search query "famous singer," and in response to the selection of the search result 206a, the full digital content 131 associated with the search result 206a is revealed, shown as full digital content 304. Further, the additional content 146 is revealed that is associated with the full digital content 131, shown as additional content 306. In the illustrated example, the additional content 306 includes text associated with the full digital content 131 provided by an entity other than the entity that provides the full digital content 131 in which the frame is embedded. Additionally, the composite page 302 is hosted at a domain (e.g., example.com), similar to that of the composite page 202, that is different than the domain associated with the full digital content 304 (e.g., digitalcontentsource1.com).

In some implementations, the server computing system 102, and particularly, the embedding device 126, in response to the electronic request 142, embeds observation code 144 into the additional content 146 that is provided responsive to the electronic request 142. In short, the observation code 144 is computer-executable programming language code that provides detection and/or measuring of the visibility of the additional content 146 (e.g., within the AMP specification). The observation code 144 is executable by the client computing device 104 and causes operations to be performed at the client computing device 104.

In some examples, embedding of the observation code 144 into the additional content 146 is enabled by association of the flag with the snippet of the digital content 131, as described above. Specifically, by including the flag, the server computing system 102 is able to embed the observation code 144 within the additional content 146. In some examples, execution of the observation code 144 causes the client computing device 104 to register the observation code 144 within a parent window within which the frame element is located. FIG. 4 illustrates examples 402, 404 of computer-implemented programming language code of the observation code 144.

In some implementations, the server computing system 102, and specifically, the visibility tracking device 128, determines that the additional content 146 was visually perceptible on the display 150 of the client computing device 104. Specifically, the visibility tracking device 128 determines that the additional content 146 was visually perceptible on the display 150 of the client computing device 104 based on receiving an electronic message 152 from the observation code 144 executing at the client computing device 150. The electronic message 152 generated by the observation code 144 can include information that the additional content 146 was visually perceptible on the display 150 of the client computing device 104 based on satisfying one or more qualifications. For example, the qualifications can include location-based qualifications, e.g., a location of the additional content 146 within the display 150 of the client computing device 104, and time-based qualifications, e.g., time that the additional content 146 is presented within the display 150 of the client computing device 104.

To that end, based on satisfaction of at least one of the qualifications, the observation code 144 generates the electronic message 152 including information that the additional content 146 was visually perceptible on the display 150 of the client computing device 104. The client computing device 104 transmits the electronic message 152 to the server computing system 102, e.g., over one or more networks.

In some examples, execution of the observation code 144 causes the client computing device 104 and/or the observation code 144 to accumulate information specifying a location of the frame element in the composite page 140 and specifying a portion of the composite page 140 that is presented within the display 150. Specifically, the observation code 144 accumulates information regarding the location of the frame element as presented within the composite page 140, e.g., whether the frame element associated with the additional content 146 is visually perceptible on the display 150. Furthermore, the observation code 144 accumulates information regarding a portion of the composite page 140 that is presented within the display 150. Based on the accumulated information and the qualifications, the observation code 144 can determine that the additional content 146 was visually perceptible on a display 150 of the client computing device 104, which such determination provided to the server computing system 102 by the electronic message 152.

In some examples, the observation code 144 accumulates information regarding the location of the frame element as presented within the composite page by obtaining coordinates of the frame element associated with the additional content 146 with respect to the composite page 140. Based on such coordinates, the observation code 144 can determine whether the additional content 146 was visually perceptible on the display 150 of the client computing device 104. In some examples, the observation code 144 can determine that a portion of the frame element associated with the additional content 146 is visually perceptible on the display 150 of the client computing device 104, and further, which particular portion associated with the additional content 146 is visually perceptible on the display 150 of the client computing device 104 and which particular portion associated with the additional content 146 is not is visually perceptible on the display 150 of the client computing device 104.

In some examples, execution of the observation code 144 causes the client computing device 104 and/or the observation code 144 to determine, based on the accumulated information specifying the location of the frame element and the portion of the composite page 140 presented within the display 150, that the additional content 146 was presented within the display 150 for an amount of time. Specifically, the observation code 144, based on the aforementioned accumulated information, determines whether the additional content 146 was presented within the display 150 for an amount of time. Based on the amount of time and the qualifications, the observation code 144 can determine that the additional content 146 was visually perceptible on a display 150 of the client computing device 104, which such determination provided to the server computing system 102 by the electronic message 152.

In some examples, execution of the observation code 144 causes the client computing device 104 and/or the observation code 144 to generate the electronic message 152 specifying that the additional content 146 was presented within the display 150 and transmit the electronic message 152 to the server computing system 102. That is, the observation code 144 determines that the additional content 146 was visually perceptible on a display 150 of the client computing device 104, and in response, generates the electronic message 152 indicating such.

In some implementations, the server computing system 104 modifies the log repository 110 based on receiving the electronic message 152. Specifically, the server computing system 104 modifies the log repository 110 based on the indication of the visual perception of the additional content 146. In some examples, the visibility tracking device 128 modifies the log repository 110 based on receiving the electronic message 152. In some examples, modifying the log repository 110 includes updating a database item associated with the additional content 146 to indicate that the additional content 146 was visually perceptible on the display 150 of the client computing device 104, as described above. In some examples, the aforementioned database item can be associated with the appropriate digital content source 106 that is associated with the additional content 146 and/or the selected digital content 131.

Figure 5:
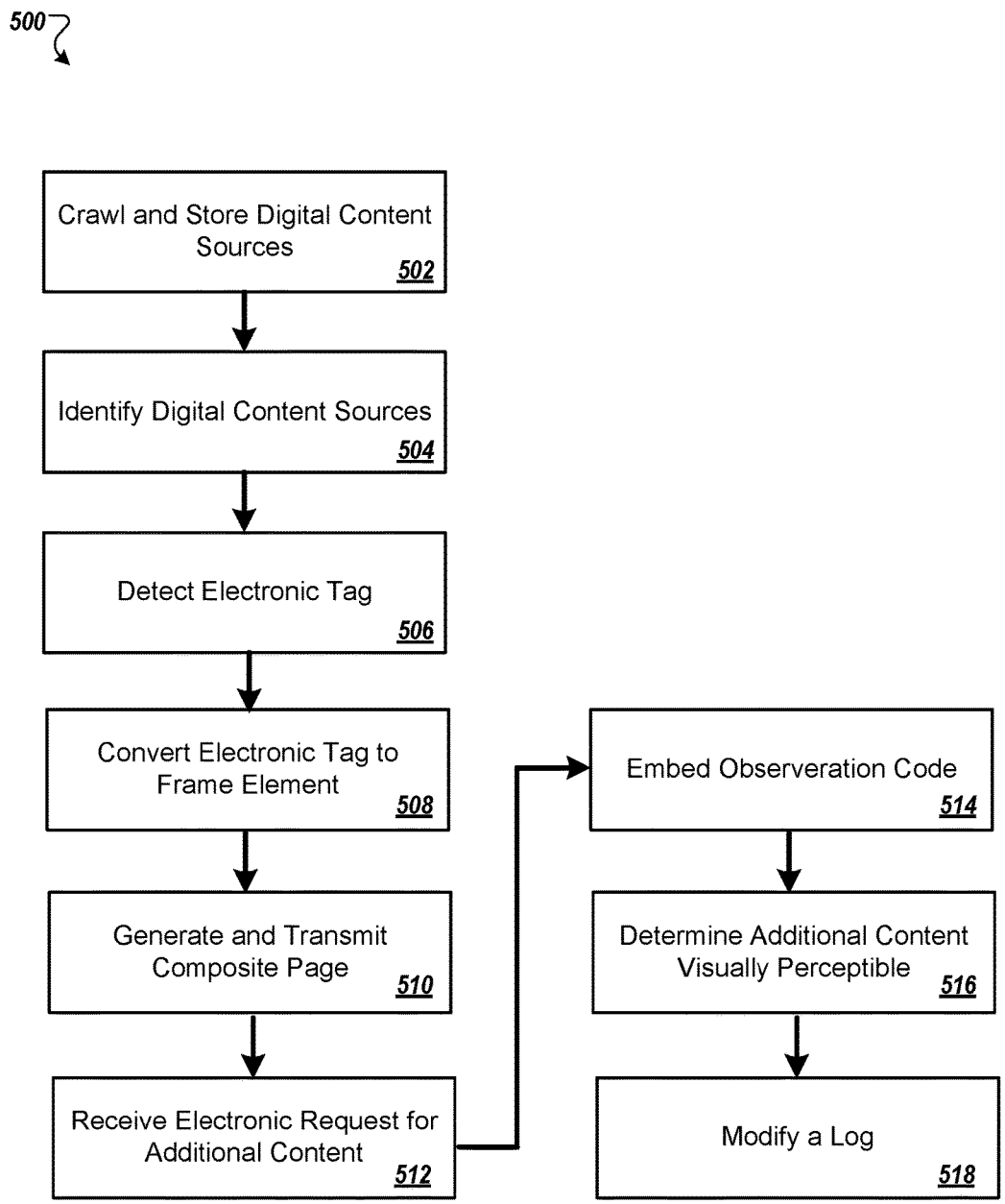
FIG. 5 illustrates an example process for detecting a visibility of digital content on a composite page.

FIG. 5 illustrates an example process 500 for detecting a visibility of digital content on a composite page. The process 500 can be performed, for example, by the server computing system 102 and/or the mobile computing device 104, or another data processing apparatus. The process 500 can also be implemented as instructions stored on computer storage medium, and execution of the instructions by one or more data processing apparatus cause the one or more data processing apparatus to perform some or all of the operations of the process 500.

Various digital content sources are electronically crawled to identify and store various digital content from the various digital content sources in a repository (502). For example, with reference to FIG. 1, the electronic document inspection device 120 electronically crawls the digital content sources 106 and stores various digital content 130 from the various digital content sources 106 at the digital content registry 108. A set of the digital content are identified that are responsive to a search query (504). For example, with reference to FIG. 1, the server computing system 102 accesses the digital content 131 stored by the digital content repository 108 (and that was obtained from the digital content sources 106) to identify a set of the digital content 131 that is response to the search query. An electronic tag is detected within at least one portion of digital content in the set of digital content 131 (506). For example, with reference to FIG. 1, the tag converter device 122 detects an electronic tag within at least one portion of digital content in the set of digital content 131.

The electronic tag is automatically converted to a frame element (508). For example, with reference to FIG. 1, the tag converter device 122 replaces the electronic tag that is associated with the portion of digital content 131 with a frame element. A composite page is generated and transmitted to a given user device that is remotely located (510). For example, with reference to FIG. 1, the composite page generator 124 generates a composite page 140. The composite page generator 124 transmits the composite page 140 to the client computing device 104 that is remotely located relative to the server computing system 102, e.g., over one or more networks. In some examples, the composite page 140 is i) hosted at a different domain than at least some digital content in the set of the digital content 131, ii) includes different digital content from the set of digital content 31 that are identified and stored from the various multiple different digital content sources 106, and iii) initially hides presentation of the frame element in the composite page 140.

An electronic request is received for additional content that was generated by the frame element and that identifies one of the various digital content sources (512). For example, with reference to FIG. 1, the server computing system 102 receives an electronic request 142 for additional content 146, e.g., over one or more networks. Further, the electronic request 142 is generated by the frame element and identifies one of the digital content sources 106. In response to the request, observation code is embedded into the additional content provided responsive to the electronic request (514). For example, with reference to FIG. 1, embedding device 126, in response to the electronic request 142, embeds an observation code 144 into the additional content 146 that is provided responsive to the electronic request 142.

It is determined that the additional content was visually perceptible on a display of the given user device based on an electronic message received from the intersection observer executing at the given user device (516). For example, with reference to FIG. 1, the visibility tracking device 128 determines that the additional content 146 was visually perceptible on a display 150 of the client computing device 104. Specifically, the visibility tracking device 128 determines that the additional content 146 was visually perceptible on the display 150 of the client computing device 104 based on receiving an electronic message 152 from the observation code 144 executing at the client computing device 150. A log is modified based on the visual perception of the additional content with the digital content that was identified in the request (518). For example, with reference to FIG. 1, the server computing system 104 modifies the log repository 110 based on receiving the electronic message 152. Specifically, the server computing system 104 modifies the log repository 110 based on the visual perception of the additional content 146.

Figure 6:
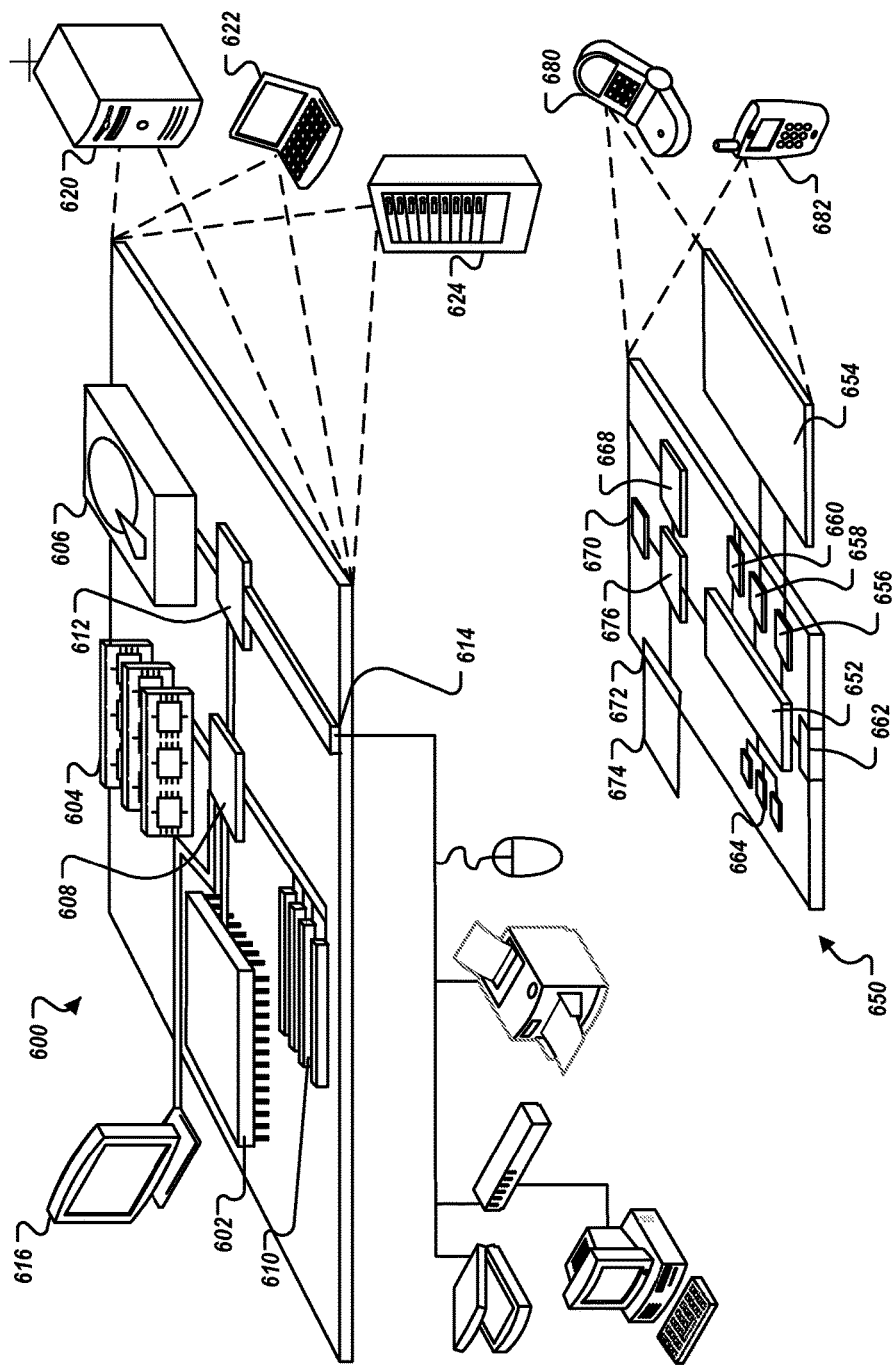
FIG. 6 illustrates an example computing system and mobile computing device that may be used to implement the techniques described herein.

FIG. 6 shows an example of a generic computer device 600 and a generic mobile computer device 650, which may be used with the techniques described here. Computing device 600 is intended to represent various forms of digital computers, such as laptops, desktops, workstations, personal digital assistants, servers, blade servers, mainframes, and other appropriate computers. Computing device 650 is intended to represent various forms of mobile devices, such as personal digital assistants, cellular telephones, smartphones, and other similar computing devices. The components shown here, their connections and relationships, and their functions, are meant to be exemplary only, and are not meant to limit implementations of the inventions described and/or claimed in this document.

Computing device 600 includes a processor 602, memory 604, a storage device 606, a high-speed interface 608 connecting to memory 604 and high-speed expansion ports 610, and a low speed interface 612 connecting to low speed bus 614 and storage device 606. Each of the components 602, 604, 606, 608, 610, and 612, are interconnected using various busses, and may be mounted on a common motherboard or in other manners as appropriate. The processor 602 may process instructions for execution within the computing device 600, including instructions stored in the memory 604 or on the storage device 606 to display graphical information for a GUI on an external input/output device, such as display 616 coupled to high speed interface 608. In other implementations, multiple processors and/or multiple buses may be used, as appropriate, along with multiple memories and types of memory. Also, multiple computing devices 600 may be connected, with each device providing portions of the necessary operations (e.g., as a server bank, a group of blade servers, or a multi-processor system).

The memory 604 stores information within the computing device 600. In one implementation, the memory 604 is a volatile memory unit or units. In another implementation, the memory 604 is a non-volatile memory unit or units. The memory 604 may also be another form of computer-readable medium, such as a magnetic or optical disk.

The storage device 606 is capable of providing mass storage for the computing device 600. In one implementation, the storage device 606 may be or contain a computer-readable medium, such as a floppy disk device, a hard disk device, an optical disk device, or a tape device, a flash memory or other similar solid state memory device, or an array of devices, including devices in a storage area network or other configurations. A computer program product may be tangibly embodied in an information carrier. The computer program product may also contain instructions that, when executed, perform one or more methods, such as those described above. The information carrier is a computer- or machine-readable medium, such as the memory 604, the storage device 606, or a memory on processor 602.

The high speed controller 608 manages bandwidth-intensive operations for the computing device 600, while the low speed controller 612 manages lower bandwidth-intensive operations. Such allocation of functions is exemplary only. In one implementation, the high-speed controller 608 is coupled to memory 604, display 616 (e.g., through a graphics processor or accelerator), and to high-speed expansion ports 610, which may accept various expansion cards (not shown). In the implementation, low-speed controller 612 is coupled to storage device 606 and low-speed expansion port 614. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 600 may be implemented in a number of different forms, as shown in the figure. For example, it may be implemented as a standard server 620, or multiple times in a group of such servers. It may also be implemented as part of a rack server system 624. In addition, it may be implemented in a personal computer such as a laptop computer 622. Alternatively, components from computing device 600 may be combined with other components in a mobile device (not shown), such as device 650. Each of such devices may contain one or more of computing device 600, 650, and an entire system may be made up of multiple computing devices 600, 650 communicating with each other.

Computing device 650 includes a processor 652, memory 664, an input/output device such as a display 654, a communication interface 666, and a transceiver 668, among other components. The device 650 may also be provided with a storage device, such as a microdrive or other device, to provide additional storage. Each of the components 650, 652, 664, 654, 666, and 668, are interconnected using various buses, and several of the components may be mounted on a common motherboard or in other manners as appropriate.

The processor 652 may execute instructions within the computing device 640, including instructions stored in the memory 664. The processor may be implemented as a chipset of chips that include separate and multiple analog and digital processors. The processor may provide, for example, for coordination of the other components of the device 650, such as control of user interfaces, applications run by device 650, and wireless communication by device 650.

Processor 652 may communicate with a user through control interface 648 and display interface 656 coupled to a display 654. The display 654 may be, for example, a TFT LCD (Thin-Film-Transistor Liquid Crystal Display) or an OLED (Organic Light Emitting Diode) display, or other appropriate display technology. The display interface 656 may comprise appropriate circuitry for driving the display 654 to present graphical and other information to a user. The control interface 658 may receive commands from a user and convert them for submission to the processor 652. In addition, an external interface 662 may be provide in communication with processor 652, so as to enable near area communication of device 650 with other devices. External interface 662 may provide, for example, for wired communication in some implementations, or for wireless communication in other implementations, and multiple interfaces may also be used.

The memory 664 stores information within the computing device 650. The memory 664 may be implemented as one or more of a computer-readable medium or media, a volatile memory unit or units, or a non-volatile memory unit or units. Expansion memory 654 may also be provided and connected to device 650 through expansion interface 652, which may include, for example, a SIMM (Single In Line Memory Module) card interface. Such expansion memory 654 may provide extra storage space for device 650, or may also store applications or other information for device 650. Specifically, expansion memory 654 may include instructions to carry out or supplement the processes described above, and may include secure information also. Thus, for example, expansion memory 654 may be provide as a security module for device 650, and may be programmed with instructions that permit secure use of device 650. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 664, expansion memory 654, memory on processor 652, or a propagated signal that may be received, for example, over transceiver 668 or external interface 662.

Device 650 may communicate wirelessly through communication interface 666, which may include digital signal processing circuitry where necessary. Communication interface 666 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 668. In addition, short-range communication may occur, such as using a Bluetooth, WiFi, or other such transceiver (not shown). In addition, GPS (Global Positioning System) receiver module 650 may provide additional navigation- and location-related wireless data to device 650, which may be used as appropriate by applications running on device 650.

Device 650 may also communicate audibly using audio codec 660, which may receive spoken information from a user and convert it to usable digital information. Audio codec 660 may likewise generate audible sound for a user, such as through a speaker, e.g., in a handset of device 650. Such sound may include sound from voice telephone calls, may include recorded sound (e.g., voice messages, music files, etc.) and may also include sound generated by applications operating on device 650.

The computing device 650 may be implemented in a number of different forms, as shown in the figure. For example, it may be implemented as a cellular telephone 680. It may also be implemented as part of a smartphone 682, personal digital assistant, or other similar mobile device.

Figure 7:
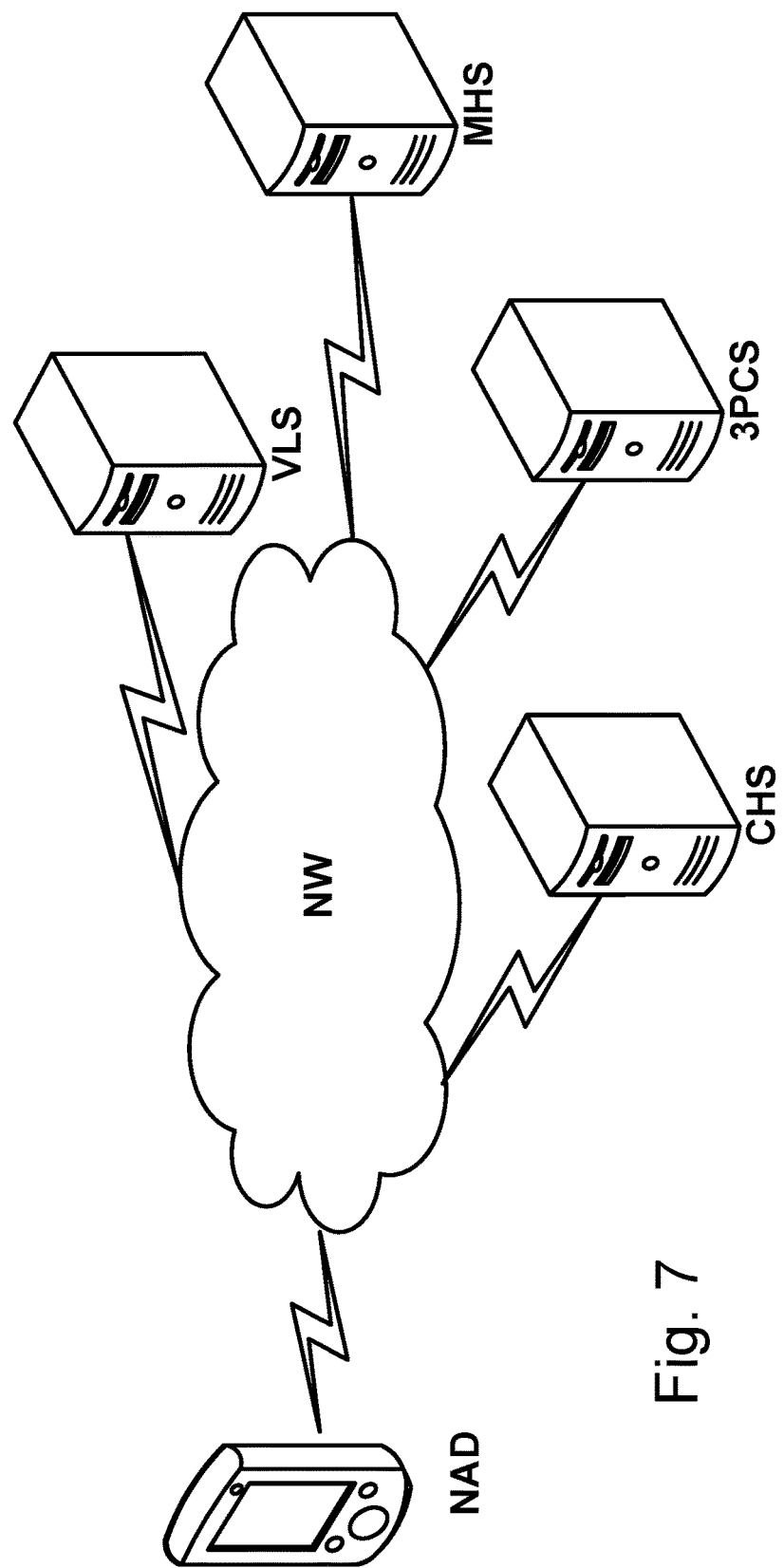
FIG. 7 illustrates an environment for detecting a visibility of digital content on a composite page implementing the techniques described herein.

As shown in FIG. 7, the computing device 650 or the may be implemented as a network accessible device NAD, such as a smartphone. The network accessible device NAD includes a communication section CS adapted to provide a communication connection between the network accessible device NAD and at least one or more of the following: (i) at least one content host server CHS, (ii) at least one third party content server 3PCS, (iii) at least one a media host server MHS, and/or (iv) a visibility logging server VLS via a network, such as the internet.

The communication connection, once established, serves to receive at least one (i) content item CI, (ii) third party content item 3PCI and/or (iii) media item MI from the respective server and to transceive messages regarding the received items to at least one of the respective servers.

It is understood that in FIGS. 7-9a, 9b, the content item CI corresponds to the digital content 130 above, the third party content item 3PCI corresponds to the digital content 131 above, the media item MI corresponds to the additional content 146 above, the content host server CHS corresponds to the repository 108 above, the third party content server 3PCS and the media host server MHS correspond to the digital content sources 106 above, and the visibility logging server VLS corresponds to the log repository 110 above.

Figure 8:
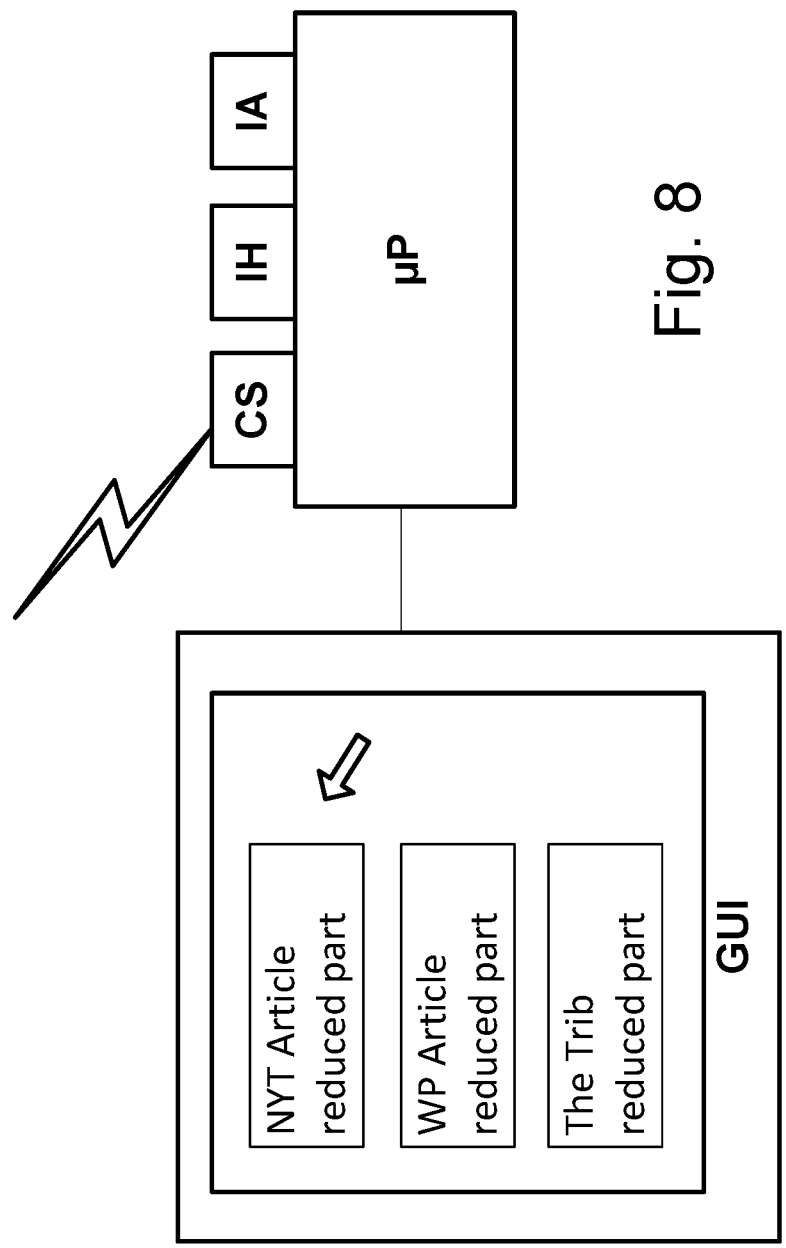
FIG. 8 illustrates an example mobile computing device that may be used to implement the techniques described herein.

As illustrated in FIG. 8, the network accessible device NAD includes a processor µP designed or configured to operate a graphical user interface GUI adapted to present to a user, at least a first, reduced part and/or a second, expanded part of at least one item received from a third party content server within at least one respective section of the graphical user interface GUI attributed to the at least one third party content server.

The network accessible device NAD further includes an item handler IH adapted to (i) select, by a user action relative to the network accessible device, an item from a population of at least partly presented items, and in response to the user selection, and to (ii) present at least the second, expanded part of the selected one item in a respective section of the graphical user interface GUI to the user and relative to the second, expanded part of a third party content item, at least one media item.

Figure 9A:
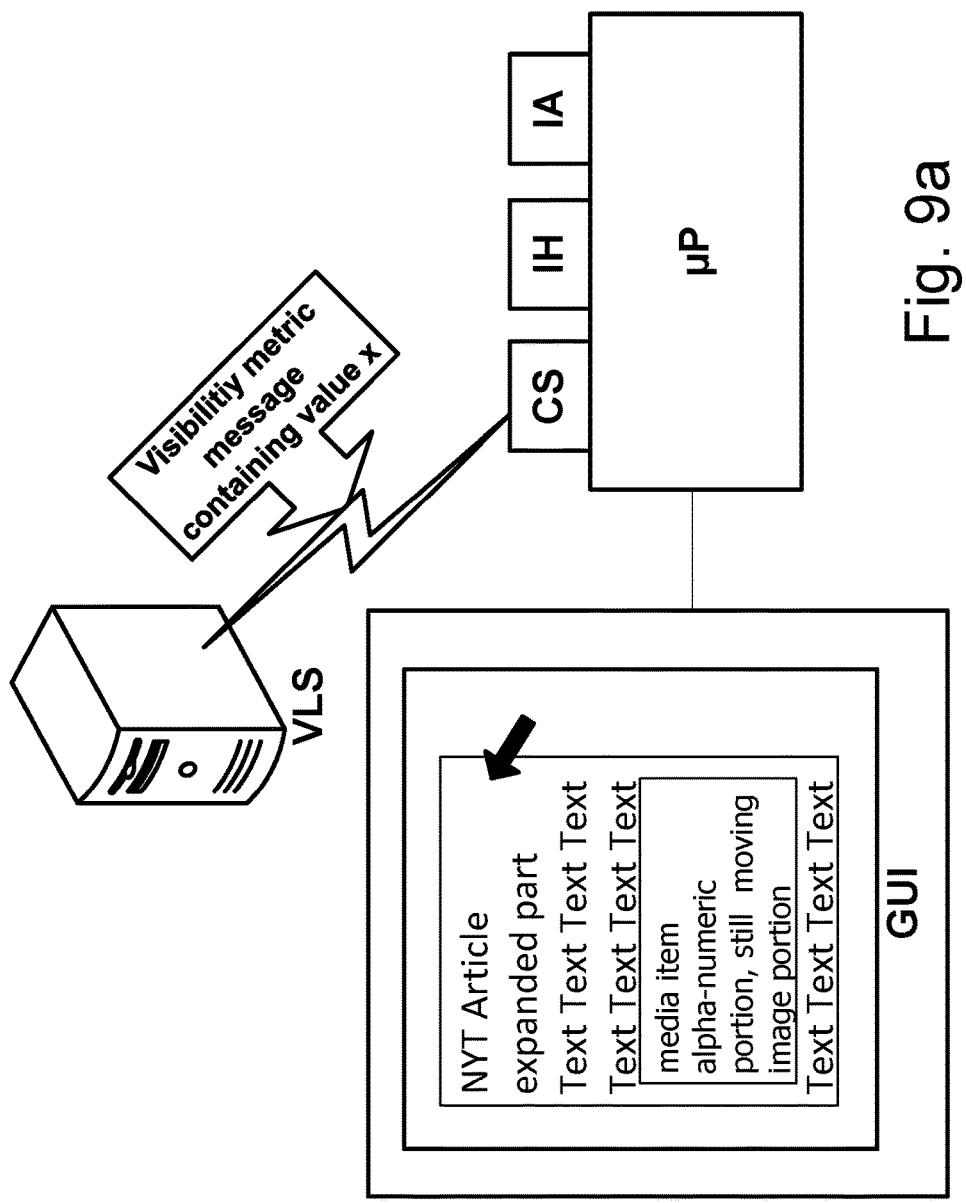
FIG. 9a illustrates an example graphical user interface displaying an example composite page including a media item in a first degree of visibility.
Figure 9B:
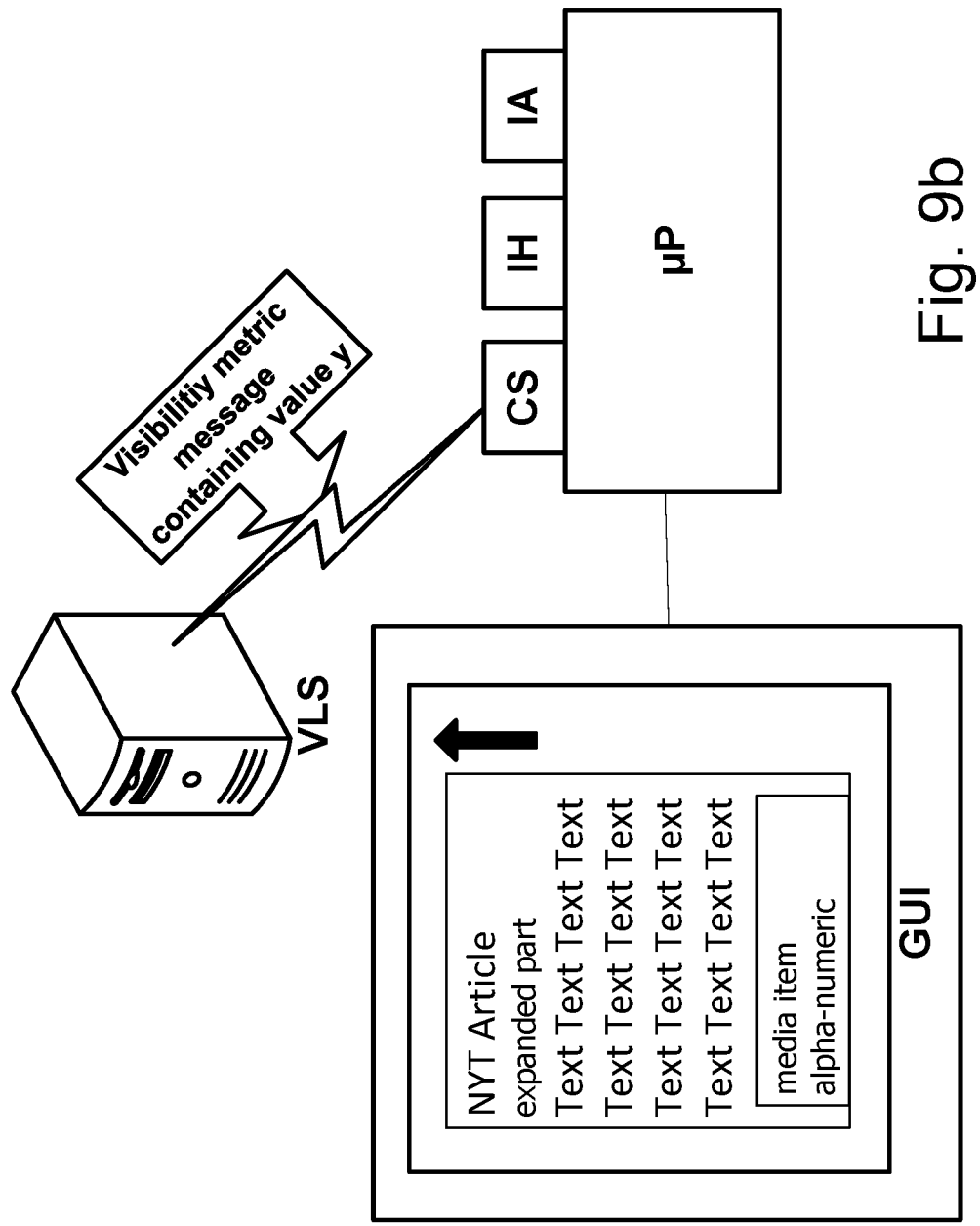
FIG. 9b illustrates the example graphical user interface of FIG. 9a displaying an example composite page including a media item in a second degree of visibility.

As illustrated in FIG. 9a, 9b, the network accessible device NAD further includes an item analyzer IA adapted to analyze the presented third party content item and/or the presented media item with respect to a visibility metric and/or any user action with respect to the presented third party content item and/or the presented media item. Depending on the degree of visibility of the presented third party content item and/or the presented media item with regard to (i) a time duration of its presentation, (ii) a display position of its presentation, and/or (iii) a measure of completeness of its presentation, the visibility metric is determined by the item analyzer IA. The item analyzer IA will then transmit at least one respective message to at least one of (i) the at least one content host server, (ii) the at least one third party content server, (iii) the at least one a media host server, and/or (iv) the visibility logging server. The message includes a visibility metric value and is transmitted if a predetermined visibility metric threshold is exceeded. The message including the visibility metric value can—in certain scenarios—transmitted only, in case a predetermined visibility metric threshold is exceeded.

As illustrated in FIG. 9a, the media item is visible to a large degree, here e.g. complete, for a certain period of time as an embedded or associated item to the presented item (here, a "NYT article"). The black arrow pointing to the presented item is a pointer icon. Its activation by a user (double click or finger tap) causes the presented item to expand and rest completely visible on the display.

This causes a message including a visibility metric value (x) to be sent the visibility logging server. In an alternative implementation, the message including the visibility metric value is transmitted only, in case a predetermined visibility metric threshold is exceeded. This further avoids network traffic.

In FIG. 9b, on the other hand, the media item is visible to a smaller degree, here incomplete, for a relatively shorter period of time. The black arrow pointing upwards next to the presented item is activated by a user via e.g. double click or finger tap. This causes the presented item to scroll downwardly out of the display. This causes a different message including a visibility metric value (y) to be sent the visibility logging server. It is understood that the media item can be caused to move out of the display in different directions by other actions, be they user-stimulated or otherwise.

The item handler IA may be further to convert a received media item into an iframe or a flash media for presenting it and generate a source code for presentation and/or interpretation of the received media item by a renderer from attributes that are received together with the received media item, and wherein a flag is included as "one" to specify a specific environment.

The item handler IA may be further adapted to include third party content item into a separate window on the display.

The item handler may include a renderer which is adapted to embed an intersection observer compliant listener that is capable of receiving/transmitting visibility metric measurement messages.

Based on the visibility metric of the media items and/or the presented third party content items specific action can be triggered that e.g. have an impact on the presented items. Their visual appearance may be altered, their potential presentation in the future may be stopped altogether, or the like. This avoids sending out items that have little or no visibility on the network accessible device but only increase the network/internet traffic, cause an increased CPU utilization and battery consumption in the network accessible device.

Various implementations of the systems and techniques described here may be realized in digital electronic circuitry, integrated circuitry, specially designed ASICs (application specific integrated circuits), computer hardware, firmware, software, and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and may be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here may be implemented on a computer having a display device (e.g., a CRT (cathode ray tube) or LCD (liquid crystal display) monitor) for displaying information to the user and a keyboard and a pointing device (e.g., a mouse or a trackball) by which the user may provide input to the computer. Other kinds of devices may be used to provide for interaction with a user as well; for example, feedback provided to the user may be any form of sensory feedback (e.g., visual feedback, auditory feedback, or tactile feedback); and input from the user may be received in any form, including acoustic, speech, or tactile input.

The systems and techniques described here may be implemented in a computing system that includes a back end component (e.g., as a data server), or that includes a middleware component (e.g., an application server), or that includes a front end component (e.g., a client computer having a graphical user interface or a Web browser through which a user may interact with an implementation of the systems and techniques described here), or any combination of such back end, middleware, or front end components. The components of the system may be interconnected by any form or medium of digital data communication (e.g., a communication network). Examples of communication networks include a local area network ("LAN"), a wide area network ("WAN"), and the Internet.

The computing system may include clients and servers. A client and server are generally remote from each other and typically interact through a communication network. The relationship of client and server arises by virtue of computer programs running on the respective computers and having a client-server relationship to each other.

While this disclosure includes some specifics, these should not be construed as limitations on the scope of the disclosure or of what may be claimed, but rather as descriptions of features of example implementations of the disclosure. Certain features that are described in this disclosure in the context of separate implementations can also be provided in combination in a single implementation. Conversely, various features that are described in the context of a single implementation can also be provided in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the present disclosure have been described. Other implementations are within the scope of the following claims. For example, the actions recited in the claims can be performed in a different order and still achieve desirable results. A number of implementations have been described. Nevertheless, it will be understood that various modifications may be made without departing from the spirit and scope of the disclosure. For example, various forms of the flows shown above may be used, with steps re-ordered, added, or removed. Accordingly, other implementations are within the scope of the following claims.

The invention claimed is:

1. A method, comprising:
electronically crawling various digital content sources, by one or more servers, to identify and store, by the one or more servers, various digital content from the various digital content sources in a repository;
identifying a set of the digital content that are responsive to a search query;
detecting, by the one or more servers, an electronic tag within at least one portion of digital content in the set of the digital content;
automatically converting, by the one or more servers, the electronic tag to a frame element;
generating, by the one or more servers, and transmitting, to a given user device that is remotely located relative to the one or more servers, a composite page that:

is hosted at a different domain than at least some digital content in the set of the digital content;

includes different digital content from the set of the digital content that are identified and stored from the various digital content sources; and initially hides presentation of the frame element in the composite page;

receiving, by the one or more servers, an electronic request for additional content that was generated by the frame element and that identifies one of the various digital content sources;

embedding, by the one or more servers and in response to the electronic request, observation code into the additional content provided responsive to the electronic request;

determining that the additional content was visually perceptible on a display of the given user device based on an electronic message received from the observation code executing at the given user device; and modifying a log based on the visual perception of the additional content with the digital content that was identified in the electronic request.

2. The method of claim 1, further comprising:

executing, by the given user device and within the frame element, the observation code, wherein execution of the observation code causes operations to be performed at the user device, including registering the observation code within a parent window within which the frame element is located.

3. The method of claim 2, wherein the execution of the observation code causes operations to be performed at the user device, including accumulating, by the observation code, information specifying a location of the frame element in the composite page and specifying a portion of the composite page that is presented within the display.

4. The method of claim 3, wherein the execution of the observation code causes operations to be performed at the user device, including determining, based on the information specifying the location of the frame element and specifying the portion of the composite page presented within the display, that at least a specified portion of the additional content was presented within the display for at least a specified amount of time.

5. The method of claim 4, wherein the execution of the observation code causes operations to be performed at the user device, including:

generating the electronic message specifying that the additional content was presented within the display; and transmitting the electronic message to the one or more servers.

6. The method of claim 1, further comprising:

in response to the electronic request, updating, by the user device, the composite page to reveal the digital content from the set of the digital content associated that is selected, wherein updating the composite page is independent of an additional request for the digital content.

7. A system, comprising:

one or more computers including:

an electronic document inspection device that electronically crawls various digital content sources to identify and store various digital content from the various digital content sources in a repository;

a tag converter device that detects an electronic tag within at least one portion of digital content in the set of digital content and automatically converts the electronic tag to a frame element;

a composite page generator that generates and transmits the composite page to a given user device that is remotely located relative to the one or more servers, wherein:

the composite page is hosted at a different domain than at least some digital content in the set of the digital content, includes different digital content from the set of digital content that are identified and stored from the various multiple different digital content sources, and initially hides presentation of the frame element in the composite page;

an embedding device that embeds an observation code into additional content in response to a request for additional content that was generated by the frame element and that identifies one of the various digital content sources; and a visibility tracking device that determines that the additional content was visually perceptible on a display of the given user device based on an electronic message received from the observation code executing at the given user device, and that modifies a log based on the visual perception of the additional content with the digital content that was identified in the request.

8. The system of claim 7, wherein the observation code is registered within a parent window within which the frame element is located.

9. The system of claim 8, wherein the observation code accumulates information specifying a location of the frame element in the composite page and specifies a portion of the composite page that is presented within the display.

10. The system of claim 9, wherein the observation code determines, based on the information specifying the location of the frame element and specifying the portion of the composite page presented within the display, that at least a specified portion of the additional content was presented within the display for at least a specified amount of time.

11. The system of claim 10, wherein the observation code generates the electronic message specifying that the additional content was presented within the display and transmits the electronic message to the one or more computers.

12. A non-transitory computer-readable medium storing software comprising instructions executable by one or more computers which, upon such execution, cause the one or more computers to perform operations comprising:

electronically crawling various digital content sources, by one or more servers, to identify and store, by the one or more servers, various digital content from the various digital content sources in a repository;

identifying a set of the digital content that are responsive to a search query;

detecting, by the one or more servers, an electronic tag within at least one portion of digital content in the set of the digital content;

automatically converting, by the one or more servers, the electronic tag to a frame element;

generating, by the one or more servers, and transmitting, to a given user device that is remotely located relative to the one or more servers, a composite page that:

is hosted at a different domain than at least some digital content in the set of the digital content;

includes different digital content from the set of the digital content that are identified and stored from the various digital content sources; and initially hides presentation of the frame element in the composite page;

receiving, by the one or more servers, an electronic request for additional content that was generated by the frame element and that identifies one of the various digital content sources;

embedding, by the one or more servers and in response to the electronic request, observation code into the additional content provided responsive to the electronic request;

determining that the additional content was visually perceptible on a display of the given user device based on an electronic message received from the observation code executing at the given user device; and modifying a log based on the visual perception of the additional content with the digital content that was identified in the electronic request.

13. The computer-readable medium of claim 12, the operations further comprising:

executing, by the given user device and within the frame element, the observation code, wherein execution of the observation code causes operations to be performed at the user device, including registering the observation code within a parent window within which the frame element is located.

14. The computer-readable medium of claim 13, wherein the execution of the observation code causes operations to be performed at the user device, including accumulating, by the observation code, information specifying a location of the frame element in the composite page and specifying a portion of the composite page that is presented within the display.

* * * * *

UNITED STATES PATENT AND TRADEMARK OFFICE
CERTIFICATE OF CORRECTION

| | | |
|---|---|---|
| PATENT NO. | : 10,152,554 B2 | Page 1 of 1 |
| APPLICATION NO. | : 15/050810 | |
| DATED | : December 11, 2018 | |
| INVENTOR(S) | : Lewis et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 426 days.

Signed and Sealed this
Third Day of September, 2019

Andrei Iancu
*Director of the United States Patent and Trademark Office*